US006905432B2

(12) United States Patent
Oser

(10) Patent No.: US 6,905,432 B2
(45) Date of Patent: Jun. 14, 2005

(54) CHAIN DRIVE ARRANGEMENT

(76) Inventor: Jorg Oser, Rudolfstrasse 35, A-8010 Graz (AT)

( * ) Notice: Subject to any disclaimer, the term of this patent is extended or adjusted under 35 U.S.C. 154(b) by 77 days.

(21) Appl. No.: 10/037,794

(22) Filed: Jan. 4, 2002

(65) Prior Publication Data

US 2002/0142873 A1 Oct. 3, 2002

(30) Foreign Application Priority Data

Jan. 26, 2001 (EP) ............................................ 01101782

(51) Int. Cl.[7] ................................................ F16H 55/30

(52) U.S. Cl. ........................... 474/141; 74/437; 74/434; 474/70

(58) Field of Search ................................ 474/141, 158, 474/159, 70; 74/434, 437, 447; 254/219, 221, 342, 358, 359, 362, 372

(56) References Cited

U.S. PATENT DOCUMENTS 836,789 A * 11/1906 Vance ........................ 254/269
3,362,685 A 1/1968 Noye et al. ................. 254/168
3,523,463 A * 8/1970 Van Thielen ................ 474/112
3,901,002 A * 8/1975 Vetter ......................... 53/389.3
6,199,830 B1 * 3/2001 Kiiski ........................ 254/372

FOREIGN PATENT DOCUMENTS

DE 15 31 307 A 1/1970
EP 0540138 A1 * 5/1993 ............ B66D/3/14
GB 1167907 A 10/1969

OTHER PUBLICATIONS

EP English Version of Search Report dated Jul. 10, 2001.

* cited by examiner

*Primary Examiner*—David A. Bucci
*Assistant Examiner*—Bradley J. Van Pelt
(74) *Attorney, Agent, or Firm*—Horst M. Kasper

(57) ABSTRACT

A chain drive for pivot chains (7) or round link chains (8) having spur gears (2) and a polygonal chain wheel (10) reduces variations in velocity and acceleration transferred to the chains (7), (8). The driven gear wheel (3*a*) and the driving gear wheel (4*a*) consist of noncircular gear wheels having a set gear ratio adjustment so that the driving gear wheel (4*a*) is put in such a position to the driven gear wheel (3*a*) so that the slowest angular velocity coincides with the corners (29*a*) of the polygon of the chain wheel (10) and the fastest angular velocity occurs at the middle of the polygon straight lines (29*b*) of the chain wheel.

41 Claims, 4 Drawing Sheets

CHAIN DRIVE ARRANGEMENT

The invention relates generally to a chain drive having spur gears with a polygonal chain wheel for pivot steel chains or round steel chains and more particularly, to an arrangement that reduces variations in velocity and acceleration of the chains.

More specifically, the invention relates to those drive arrangements comprising at least a gear wheel attached to the chain sprocket axis with the chain sprocket axis being rotatively connected to a driven gear wheel having a varying size of the pitch circle.

BACKGROUND

Chain drives are generally used in material handling and drive technology for lifting applications and also for continuous conveyors. The compensation of the polygonal effect has been tried with different, mostly complicated compensating gears.

Practical applications to reduce the polygonal effect are hardly known due to the expensive design of compensating gears.

The chain drive designated before is known from the publication DE 15 31 307 A1 (counterpart UK publication 1,167,907). In this publication a gear wheel is driven with a varying pitch circle diameter, where a minimum radius coincides with the center of a chain pocket, while the largest radius coincides with a point at which the chain runs along the pitch circle diameter of the chain wheel.

However, with this embodiment an optimal compensation of the variations of velocities and acceleration is not possible, because the equivalent polygon needs an additional reduction of the pitch circle in the case of round steel chains at the position of the tooth middle of the chain wheel. Furthermore the known proposition does not consider that the gear tooth cutting at the concave points of intersection of the discontinuous rolling curves can not be manufactured with noncircular gear forming methods in a technically and economically feasible manner.

Also the geometric shape of the rolling curve between the points of intersection remains undefined for the individual sections. The radial und tangential velocity variations of chain drives are designated as polygon effect and constitute a problem which is well known and has been investigated many times. The chain running around the driving chain wheel results in undesirable variations of velocities and accelerations in radial and tangential directions.

SUMMARY OF THE INVENTION

The invention aims at compensating the tangential accelerations and to prevent undesired vibrations of the chain drive. It is an object of the proposed invention to solve this problem in such way, that the driven gear wheel and the driving gear wheel consist of noncircular gear wheels having a gear ratio adjustment and a positional arrangement that the smallest angular velocity coincides with the corner middle of the chain sprocket polygon and the greatest velocities occur at the middle of the chain sprocket polygon long straight lines.

This proposition consists advantageously of one or several gear sets with variable angular velocity. In doing so, the rolling curves of the gear wheel sets are shaped in such a way that they consist of continuous toothed sections of the rolling curves of noncircular gear wheels and have such a position relative to the chain wheel that the tangential variations of the chain velocity is avoided.

The noncircular gear mesh transforms a constant drive angular velocity into a variable driven angular velocity in such manner, that during an increasing or decreasing distance of the chain to the center of rotation an opposite decreasing or increasing angular velocity is created and thereby the desired tangential variation of the velocity is achieved.

However, arbitrary gear ratios with one or several noncircular gear sets cannot be realized. Only certain average gear ratios are feasible. The design results in a special advantage to use this approach for both pivot chains or roller chains (hereafter referred to as pivot chains) with equal angular sections and round steel chains or round link chains (hereafter referred to as round link chains) with unequal angular sections of the equivalent polygon of the chain wheel. Round link chains are not limited to chains with circular cross-sections but also include elliptical and other rounded chain link cross-sections.

In case of round link chains small chain wheels with a small number of teeth are also designated as chain pinions or sprockets. For the purpose of the invention the number of teeth of the sprocket being even or odd is meaningless. In case of round link chains it is advantageous that the driven gear wheel exhibits a larger radius of the pitch curve at the middle of the shorter straight line than the radius at the middle of the longer straight line and both shorter and longer straight line sections form the equivalent polygon.

A further design option is facilitated through a spur gear with one or several noncircular gear meshes, where at least the last gear mesh is embodied as noncircular gearing. The gear ratio and other parameters can be influenced by one or more such noncircular gear mesh.

According to further aspects the velocities and accelerations of driven sprockets with pivot chains can be influenced by a design which exhibits the same number of continuous rolling curve sections as the number of teeth of the sprocket.

The advantage is an almost perfect motion producing an equal chain velocity at each angular position of the sprocket.

According to another aspect of the invention related to round link chains, the driven gear wheel at the pitch curve has a number of continuous rolling curve sections that are twice the number of teeth of the sprockets. Thus, the desired motion also occurs for round link chains.

The continuous rolling curve motion is also accomplished by a driving gear wheel with continuous rolling curve sections at the pitch curve circumference. According to other features of the invention there is provided an arbitrary number of continuous rolling curve sections equal to or more than one in number for driving gear wheels for pivot chains. Thus, the gear ratio can be accordingly adjusted.

An analogous application for other chain types is achieved by providing an even number of continuous rolling curve sections for driving gear wheels for round link chains.

According to this aspect of the invention, the choice of the gear ratio of the driving gear wheel to the driven gear wheel is adjusted by the number of continuous rolling curve sections of the driving gear wheel and its related pitch angle.

According to another aspect of the invention, the geometric shape of the continuous rolling curve sections is designed in such manner that the constant driving angular velocity results from multiplying the driven angular velocity ($\omega_2=\omega_1/i$) by the gear ratio at the polygon corner mid-point, $i_m$, and the cosine of the driven angle ($\phi_2$) to achieve $i=i_m \cos \phi_2$. Appropriate rolling curve shapes satisfying this relationship can be used.

A further aspect of the invention provides continuous rolling curve sections of such geometry that the gear ratio can be approximated by basic or composite polynomials, trigonometric functions, Fourier series or periodic or mathematical approximating functions.

According to the said propositions of the rolling curves it is advantageous to derive the gear ratios at the corner middle of the polygon (i.e., the center of the corners of the equivalent polygon located at radius $r_0$) define the rolling conditions and for pivot chains to be subject to equation (A) $i_m=\phi_1/\sin\phi_{2max}$ and for round link chains to be subject to $$i_m = \frac{\beta_1+\gamma_1}{\sin\beta_2+\sin\gamma_2}. \quad \text{equation (B)}$$

At the points of intersection between the single rolling curve sections an improvement can be advantageously accomplished in such a manner that the rolling curve sections of the driven gear wheel at the points of intersection exhibit concave, onesidedly bent transition curves with tangential points on the rolling curve sections.

Another development for the transition between the rolling curve section consists of the fact that instead of the tangential transition arcs, double-bent adjustment curves or an undulating curve lies within the tangential points of the continuous rolling curve sections.

Thus, the invention provides that the transition arcs are symmetrical and can be described mathematically at least by a polynomial of fourth order or a modified trigonometric function of at least x sin x.

In practice, fabrication of the tooth gearing of the rolling curve sections can be facilitated in such a manner that the adjustment curves and transition arcs exhibit at the angle of the intersection point with the continuous rolling curve sections a radius of curvature that is equal to or greater than the radius of the manufacturing tool.

A further improvement constitutes a design, where the driven gear wheel is fabricated at least in two pieces separated at the points of intersection, so that the assembly of a primary part and a secondary part results in concave sharp rolling curve intersections without transition arcs or adjustment curves.

Further means to design the transition between two rolling curve sections consist of removing every second rolling curve section and to provide an arc gap with a radial reduction down to a centering radius.

Furthermore it is advantageous to use the sectional gap as both a tool recess and as a centering means for the complementary part. A further embodiment is provided in such manner, that the partial regions with transition arcs or adjustment curves with supposedly non compensative polygonal effects can be compensated by one or additional next higher noncircular driven gear wheels and driving gear wheels by circumferentially correctly positioned arrangements of transition arcs with appropriate gear ratio relative to the centered driven gear wheels and driving gear wheels.

DESCRIPTION OF THE DRAWINGS

The invention may take form in certain parts and in an arrangement of certain parts taken together and in conjunction with the attached drawings which form a part hereof and wherein.

DETAILED DESCRIPTION OF THE INVENTION

Figure 1:
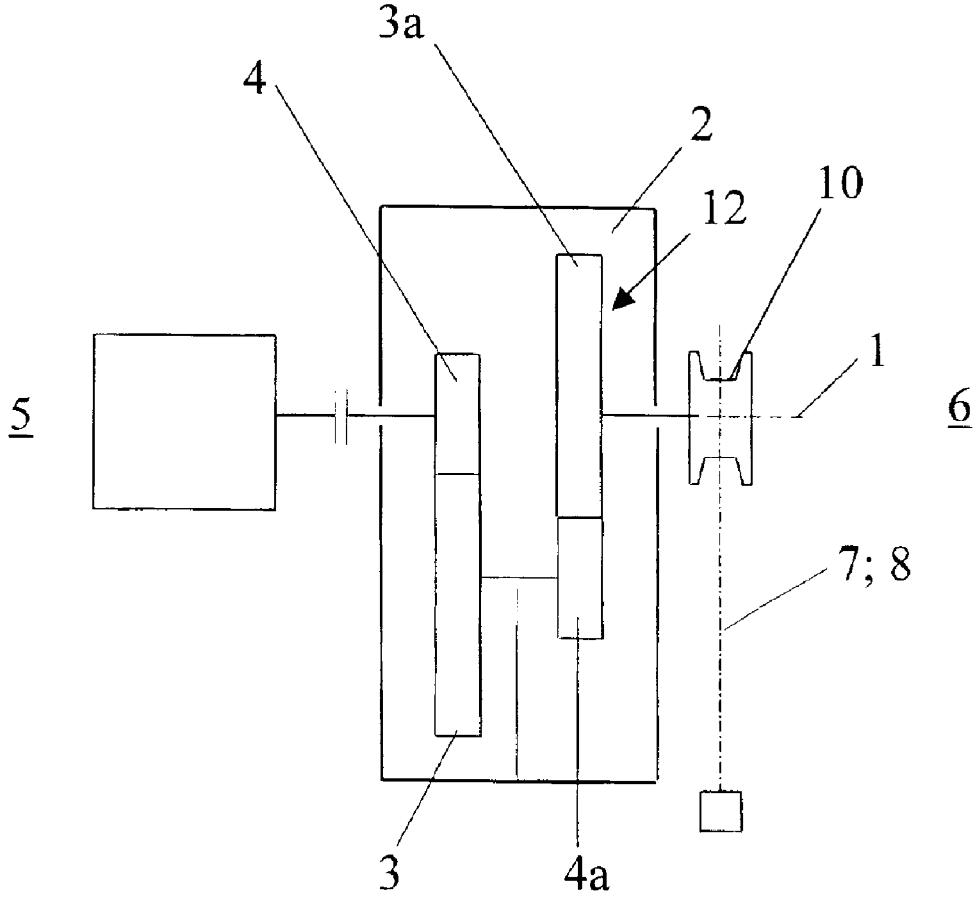
FIG. 1 is a cross section of a chain drive with a noncircular spur gear.

Referring now to the drawings wherein the showings are for the purpose of illustrating a preferred embodiment only and not for the purpose of limiting the invention, there is shown in FIG. 1 a spur gear (2). Spur gear (2) is shown with a noncircular toothed driven gear wheel (3*a*) positioned on the chain wheel axis with a traction mechanism embodied by a steel pivot chain (7) or a round link chain (8) and the driven gear wheel (3*a*) is driven by a noncircular driving gear wheel (4a). The latter is driven by an additional gear mesh embodied by a driving gear wheel (4) and a driven gear wheel (3), which is driven by an electric motor at the drive input side (5). At the drive output side (6) a chain wheel (10) is located on the chain wheel axis (1). At least the last mesh (12) (i.e., 3*a*) of the spur gear (2) holds a polygonal chain wheel (10). (As used herein, "mesh" means a pair of gear wheels, such as pinion and driven gear wheel, in toothed engagement. Accordingly, last mesh means the last pinion and driven gear wheel in the gear drive train.) It is to be appreciated that the rotational centers of chain wheel 10 and driven noncircular gear wheel (3*a*) are not only on a common axis (1) (i.e., such as the chain wheel being splined to driven gear) but the angular or circumferential positions of the chain wheel and the driven noncircular gear wheel on the common axis are fixed at set positions to assure the chain wheel polygon corresponds to certain segments of the noncircular driven gear. Similarly, the angular or circumferential position of driving gear 4*a* is fixed on its axis to assure meshing of noncircular driving gear teeth with noncircular driven gear teeth.

Means to reduce variations of velocity and accelerations transmitted to the chain wheel (10) consists of a spur gear (2) attached to the chain wheel axis (1) which is embodied by a noncircular driven gear wheel (3*a*) with a pitch curve of variable diameter rotationally attached to chain wheel axis (1). "Polygonal" is a term known in the art when used with chain wheels and may or may not refer to the shape of polygonal chain wheel (10). "Polygonal" refers to the shape of straight lines connecting the teeth or pockets on chain wheel (10) and the straight lines of the polygon are a function of whether the chain is a pivot chain (FIG. 2) or a round link chain (FIG. 3). Polygonal chain wheel is used herein in its conventional sense. When the number of pockets or teeth (c) on crank wheel (10) are few in number, other words such as a "sprocket" or "pinion" may be substituted for "chain wheel".

Figure 4:
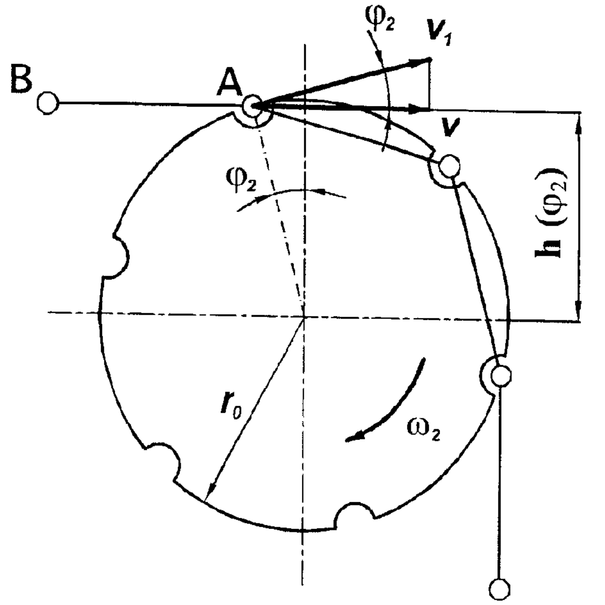
FIG. 4 is an illustration of the kinematics of the polygonal effect of the chain B—A running around the chain wheel.

During the chain wheel rotation the polygonal effect is created through the variable lever arm h ($\phi_2$) (See FIG. 4). Generally the longitudinal (chain direction can be horizontal as in FIG. 4, vertical or inclined and "longitudinal" is intended to cover all directions) chain velocity v is calculated from $$v=h(\phi_2)\omega_2 \qquad (1)$$

Choosing a law of motion with variable angular velocity $$\omega_2 = \frac{\omega_1}{i_m}\frac{1}{\cos\varphi_2} \text{ results in} \qquad (2)$$

$$h(\phi_2)=r_0 \cos \phi_2 \text{ by multipliction}$$

$$v = r_0\frac{\omega_1}{i_m} \qquad (3)$$

as resulting horizontal velocity of the chain independent from the rotational angle $\phi_2$. Integrating (2)

$$\omega_1=i_m\omega_2 \cos \phi_2$$

results in the equation defining the angle between driving and driven gear wheel $$\phi_1=i_m \sin \phi_2 \qquad (4)$$

The desired transmission behavior between $\phi_1$ and $\phi_2$ is now solved with one or more pairs of noncircular gear wheels (3*a*),(4*a*) with piecewise continuous rolling curve sections or lobes (9) in such manner, that the partial arc lengths (27) of the driven gear (3*a*) and the partial arc lengths (13) of the driving gear 4*a* subject to the rolling condition have the same length. However, the toothed rolling curve radii $r_1(\phi_1)$ and $r_2$ ($\phi_2$) depending on the angular positions $\phi_1$ and $\phi_2$ are selected in such a way, that the result is a transmission behavior according to equation (4). With a constant center distance (28*a*) of the noncircular gear wheels (3*a*), (4*a*) the generally valid rolling curve function is given in polar coordinates by $$r_1(\varphi_1) = \frac{a}{i+1} = \frac{a}{i_m\cos\varphi_2+1} = \frac{a}{\sqrt{i_m^2-\varphi_1^2}+1} \text{ and} \qquad (5)$$

$$r_2(\varphi_2) = \frac{a\,i}{i+1} = \frac{a\,i_m\cos\varphi_2}{1+i_m\cos\varphi_2} \qquad (6)$$

The desired transmission function i($\phi$) is enforced with the illustrated positional arrangement of the sprocket (10) relative to the driven gear wheel (3) by the noncircular gear wheel pair (3*a*), (4*a*) in such a way, that the angular velocities $\omega_2$ vary between a minimum:

$$\omega_{2\min} = \frac{\omega_1}{i_m}$$

at $\phi_2$=0 and h=$r_0$maximum:

$$\omega_{2\min} = \frac{\omega_1}{i_m\cos\varphi_{2\max}}$$

at $-\phi_{2max}=\phi_2=+\phi_{2max}$ and h=$r_0$ cos $\phi_{2max}$ resulting in a constant chain velocity at each position $\phi_2$.

Those skilled in the art will recognize that equations 5 and 6 define mathematical functions known as cardioids which is a closed curve between 0° and 360° resembling the shape of a heart. More specifically, the shape of rolling curve section 9 in the preferred embodiment is generated as a segment of the functions described by the polar equations (5) and (6). In the preferred embodiment, rolling curve sections are formed as that segment of a cardioid which most closely resembles a circle. The cardioid is preferred because it is mathematically correct. In this connection it is to be noted that FIG. 2 of the drawings is schematically illustrating the radii, $r_1$, $r_2$, of rolling curve sections 9 for drawing clarity purposes only. While a cardioid is preferred, the advantages of the invention may still be realized (to a lesser extent) with rolling curve sections 9 of a different configuration. That is, sinusoidal or circular configurations for example, can be shaped to meet the requirements of a maximum radial distance at the polygon corner and a minimum radial distance at the midpoint of the polygon side line. It should also be recognized that "pitch circle" when used for defining the rolling curve sections (which carry the spur gear teeth) is not technically correct because a "circle" is not present. "Pitch circle" is used because it is a well known term in gearing literature describing gear teeth. "Rolling curve" is also well known in the gearing literature and is used herein in its general conventional sense.

Noncircular gears can be economically manufactured today for complicated rolling curve shapes. In addition they can be realized just as simply for the frequent case of round link chain sprockets (10) with unequal pitch angles as with equal pitch angles.

Feasible gear ratios at the equivalent polygon center of the corners or corner middle, $i_m$, are calculated for equal pitch angles $$i_m = \frac{\varphi_1}{\sin\varphi_{2\max}}$$

unequal pitch angles $$i_m = \frac{\beta_1+\gamma_1}{\sin\beta_2+\sin\gamma_2}$$

and for a given number of teeth c of the chain sprocket the equations to calculate the various angles are given by $$2\alpha_2=2\pi/c \quad \alpha_2=\beta_2+\gamma_2 \text{ and}$$

$$\beta_2 = a\tan\frac{\sin\alpha_2}{\frac{t-d}{t+d}+\cos\alpha_2}$$

In case of round link chains (8) for reasons of symmetry with unequal pitch (t−d) and (t+d) only an even number of arc sections, e, can be realized at the driving noncircular gear wheel with typical parameters for round steel chains such as (t−d)/(t+d)=0.5 in the following table gear ratios for the example of a chain wheel with six corners with $\phi_{2max}$=30° are calculated with c=6 follows $\alpha_2$=30° and $\beta_2$=20.1° and sin $\beta_2$+sin $\gamma_2$=0.515583.

| number of arcs "e" of drive gear wheel | round link chains unequal pitch angle | | average gear ratio | roller chains equal pitch angle | | average gear ratio |
|---|---|---|---|---|---|---|
| (13) | $\beta_1 + \gamma_1$ | $i_m = 1.94(\beta_1 + \gamma_1)$ | $i_{aL} = 2c/e$ | $\phi_1$ | $i_m = 2\phi_1$ | $i_{ar} = c/e$ |
| 1 | — | — | | π | 6.283 | 6.00 |
| 2 | π | 6.093 | 6.0 | π/2 | 3.142 | 3.00 |
| 3 | — | — | — | π/3 | 2.094 | 2.00 |
| 4 | π/2 | 3.047 | 3 | π/4 | 1.571 | 1.50 |
| 5 | — | — | — | π/5 | 1.257 | 1.20 |
| 6 | π/3 | 2.031 | 2 | π/6 | 1.047 | 1.00 |
| 7 | — | — | — | π/7 | 0.897 | 0.857 |
| 8 | π/4 | 1.523 | 1.5 | π/8 | 0.785 | 0.750 |
| . . . | . . . | . . . | . . . | . . . | . . . | . . . |

In most cases gear ratios between 1.5 and 3 will be sufficient resulting in no limitations to applications.

Figure 2:
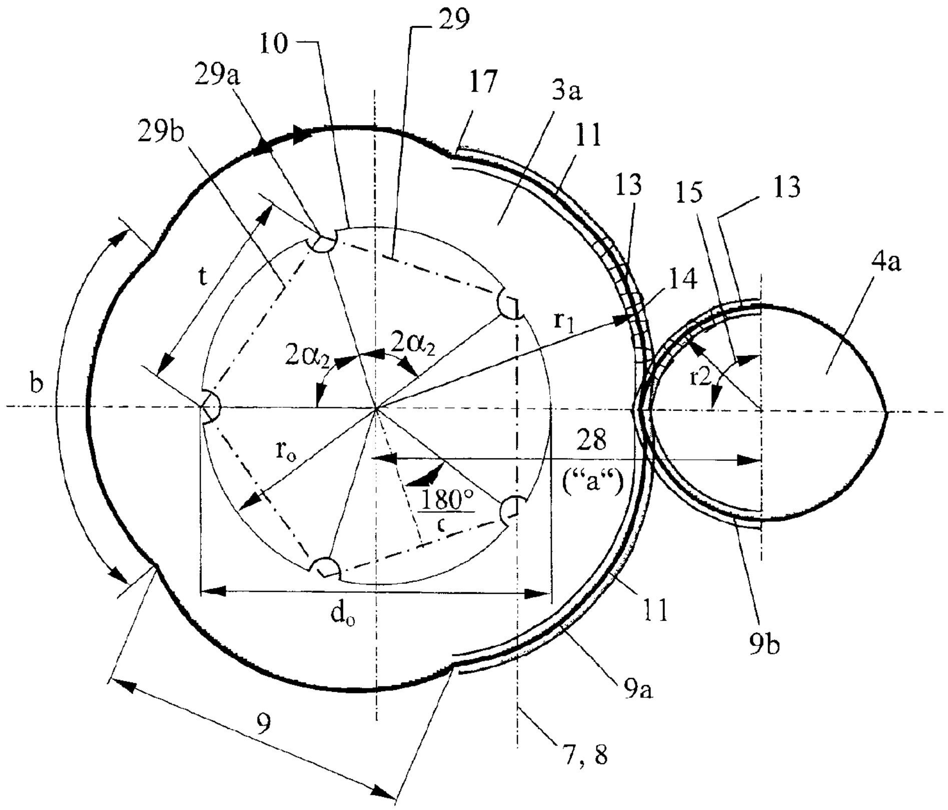
FIG. 2 is a first example of a chain wheel with equivalent polygon and noncircular gear wheel set with equal pitch angles.
Figure 3:
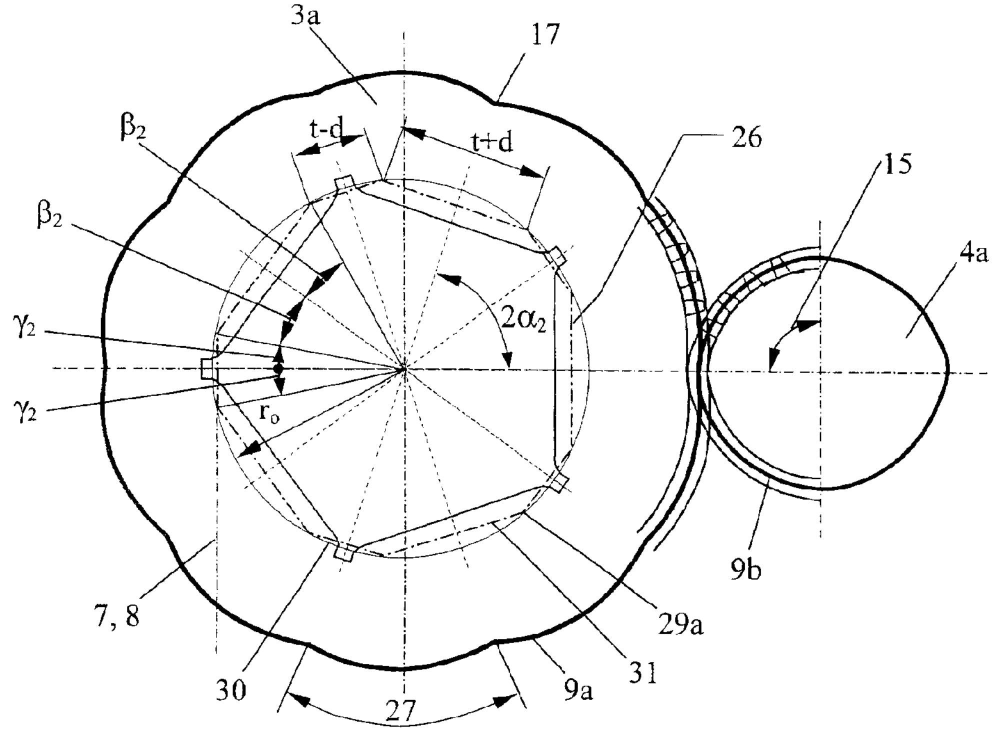
FIG. 3 is a second example of a chain sprocket with unequal pitch angles.

FIGS. 2 and 3 illustrate the embodiment of noncircular gear wheels with such gear ratio adjustment consisting of a noncircular driven gear wheel (3*a*) and a noncircular driving gear wheel (4*a*), where the driving gear wheel (4*a*) is positioned to the driven gear wheel (3*a*). In such an arrangement, the respective smallest angular velocity coincides with the corners (29*a*) of the chain wheel-polygon (29) and the respective increased velocity occurs at the middle of a polygonal straight line (29*b*). In case of round link chains (8) the pitch curve radius (13*a*) of the driven gear wheel (3) is greater in the middle of the shorter equivalent polygon straight line (30) than in the middle of the longer equivalent polygon straight line (31). The spur gear (2) may have one or several noncircular gear meshes (11), where at least the last mesh (12) has to be embodied as noncircular gear mesh (14).

In case of a pivot chain (7) the driven gear wheel (3*a*) has at the pitch curve circumference (13*a*) a number of continuous rolling curve sections (9*b*) which is equal to the number of corners of the chain wheel (10). Each of these rolling curves (9*a*) forms an arc "b".

Furthermore in case of a round link chain (8) the driven gear wheel (3*a*) has at the pitch curve circumference (13*a*) a number of continuous rolling curve sections (9*a*), which is twice the number of teeth c of the chain wheel (10).

The drive gear wheel (4*a*) is also furnished with such continuous rolling curve sections (9*b*) at the pitch curve circumference (13).

In the case of the pivot chain (7) the drive gear wheel (4*a*) has an arbitrary number of rolling curve sections (9*b*) equal to or more than one. In the case of round steel chains (8) the drive gear wheel (4*a*) has an even number of continuous rolling curve sections (9*b*).

Thus, the number of continuous rolling curve sections (9*b*) on the drive gear (4*a*) corresponding to the pitch angle (15) is adjusted to the choice of the gear ratio to the driven gear wheel (3*a*). The geometric shape of the continuous rolling curve sections (9) is embodied in such a way that at a constant angular drive velocity $\omega_1$ the driven angular velocity $\omega_2$ follows from ($\omega_2=\omega_1/i$) by multiplying the gear ratio at the corner middle with the cosine of the driven angle $\phi_2$, which results in $i=i_m \cos \phi_2$.

The continuous rolling curve sections (9) are of such geometry, that the gear ratio "i" can be approximated by basic or composite polynomials, trigonometric functions, Fourier series, sections of eccentric circular arcs, or periodic or mathematical approximating functions.

FIG. 4 illustrates the kinematic relations at sprocket (10) with the notations used. Herefrom follows velocity $v_1$ and velocity v in horizontal direction. The lever arm size h is thus a function of the driven or rotational angle $\phi_2$ at the driven angular velocity $\omega_2$.

Figure 5:
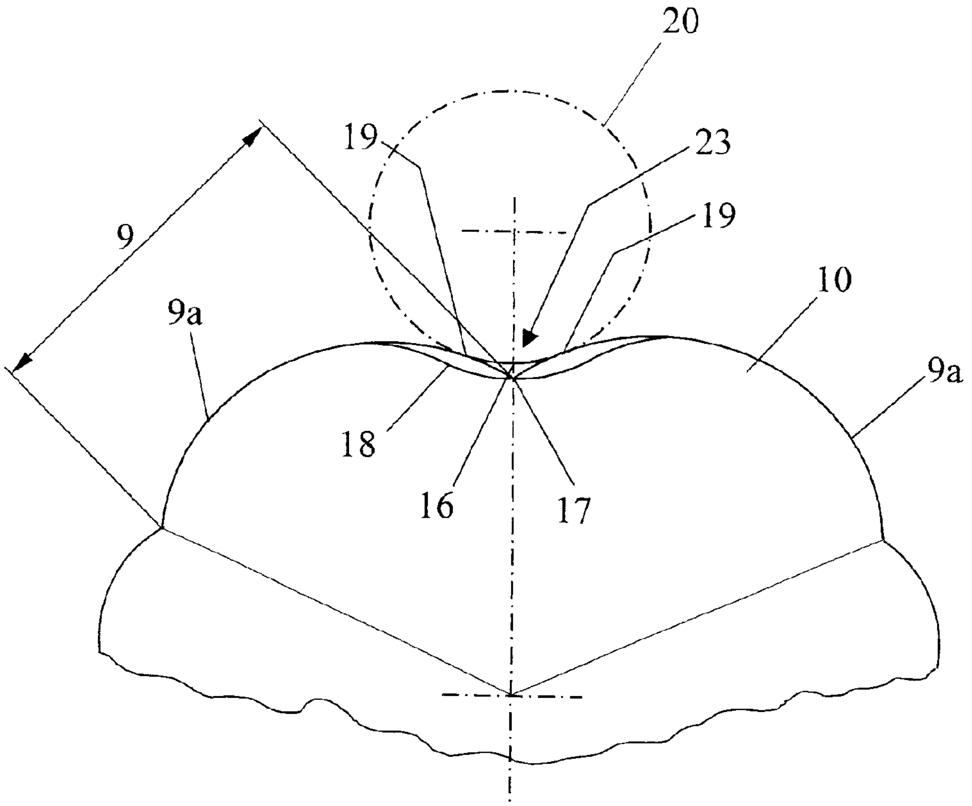
FIG. 5 shows transition curves and adjustment curves between the intersection of adjacent rolling curves at an enlarged scale.

FIG. 5 illustrates rolling curve sections (9) of the driven gear wheel (3) concave unilaterally bent transition arcs (16) at the point of intersection (17) touching the rolling curve sections (9) at tangential points. Instead of tangential transition arcs (16) at the rolling curves (9*a*) doublesidedly bent transition curves (18) or undulating curves can also lie within the tangential touching points (19) of the continuous rolling curve sections (9).

The adjustment curves (18) are symmetrical and can be described mathematically at least by a polynomial of fourth order or a modified trigonometric function being at least of the form x sin x.

At the angular position of the intersection point (17) of the continuous rolling curve sections (9) the adjustment curve (18) and the transition arcs (16) have a radius of curvature equal or greater than the radius of a manufacturing tool (20).

According to FIG. 6 the driven gear wheel (3) is manufactured in at least two pieces intersecting at points (17). A primary part (21) can be assembled with a secondary part (22) in such a way, that concave sharp intersections of the rolling curves (23) are created without transition arcs (16) or adjustment curves (18).

Figures 6A, 6B, 6C, 6D:
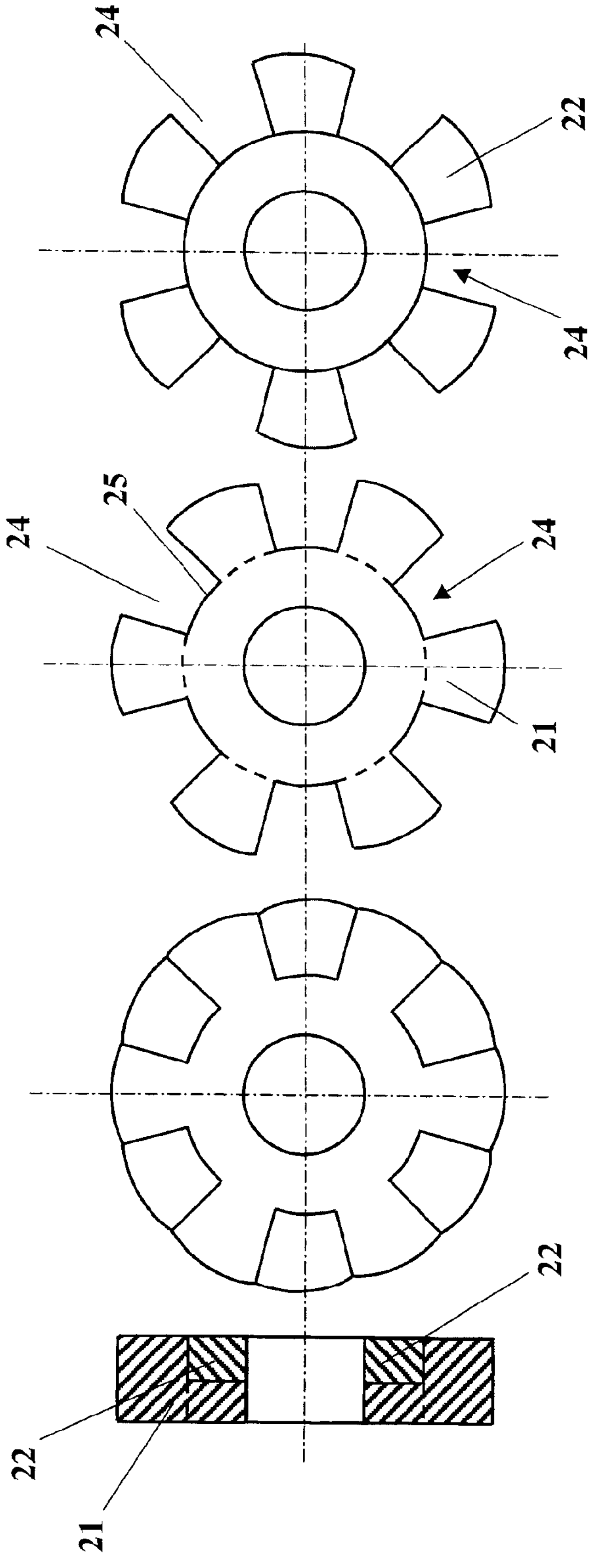
FIG. 6A is a section through a complementary noncircular gear wheel.
FIG. 6B is a front view of the complementary noncircular gear wheel.
FIG. 6C is a front view of the primary part.
FIG. 6D is a front view of the secondary part.

FIGS. 6B–6D illustrate, that every second rolling curve section (9) is absent and an arc gap (24) is reduced radially down to a centering radius (25). The arc gap (24) can be used both as a tool recess and as a centering means for the respective complementary part. It should be noted that if the rolling curve sections (9) are even numbered, the primary part (21) and secondary part (22) are identical in the preferred embodiment. This results because the centering radius (25) forms a hub which is about one-half the thickness of the pie shaped sections forming the rolling curve sections (9) at their circumference.

A possibility exists for the practical case, if the polygon effect cannot completely be compensated by transition arcs (16) or adjustment curves (18), to provide a compensation with an additional or intermediate noncircular toothed driven gear wheel (3*a*) or preferably, an additional noncircular toothed driven gear wheel (4*a*) and driving gear wheel (3*a*) (with driving gear driven by the driven noncircular gear of the first gear arrangement to produce a cascaded gear set) is used. In all cases the additional gears must be correctly located circumferentially on their rotating axis relative to the transition arcs (16) or adjustment curves (18) for compensation.

Further details result from the list of reference symbols in connection with the drawing.

| List of reference symbols | |
|---|---|
| 1 | chain wheel axis |
| 2 | spur gear |
| 3 | driven gear wheel |
| 3a | noncircular toothed driven gear wheel |
| 4 | driving gear wheel |
| 4a | noncircular toothed driving gear wheel |
| 5 | drive side |
| 6 | driven side |
| 7 | steel pivot chain |
| 8 | round link chain |
| 9 | continuous rolling curve section |
| 9a | rolling curve on driven gear |

-continued

| List of reference symbols | |
|---|---|
| 9b | rolling curve on driving gear |
| 10 | chain wheel (sprocket) |
| 11 | noncircular gear wheel mesh |
| 12 | last gear mesh |
| 13 | pitch circle circumference |
| 13a | pitch circle radius |
| 14 | noncircular gearing |
| 15 | pitch angle |
| 16 | transition arc |
| 17 | point of intersection |
| 18 | adjustment curve |
| 19 | tangential touching points |
| 20 | manufacturing tool |
| 21 | primary part |
| 22 | secondary part |
| 23 | intersection of rolling curves |
| 24 | arc gap |
| 25 | centering radius |
| 26 | equivalent polygon straight line |
| 27 | partial arc length of drive gear 3a |
| 28 | center distance "a" |
| 29 | polygon |
| 29a | polygon corners |
| 29b | polygon straight line |
| 30 | shorter equivalent polygon straight line |
| 31 | longer equivalent polygon straight line |
| a | center distance shown by reference number 28 |
| b | arc of rolling curve section 9 |
| c | number of teeth |
| d | thickness (diameter) of round link chain |
| $d_0$ | chain wheel diameter |
| e | number of arc sections of driven gear wheel |
| h | lever arm |
| i | gear ratio |
| $i_m$ | gear ratio at the corner midpoint of the polygon |
| $i_{aL}$ | average gear ratio of round link chains |
| $i_{ar}$ | average gear ratio of roller chains |
| $r_0$ | chain wheel radius |
| $r_1$ | rolling curve radius of driving gearing |
| $r_2$ | rolling curve radius of driven gearing |
| t | pitch |
| v | longitudinal chain velocity |
| x | horizontal coordinate |
| $\omega_1$ | driving angular velocity |
| $\omega_2$ | driven angular velocity |
| $\phi_1$ | driving angle/angle of rotation |
| $\phi_2$ | driven angle/angle of rotation |
| $\gamma_1$ | pitch angle |
| $\gamma_2$ | pitch angle |
| $\beta_1$ | pitch angle |
| $\beta_2$ | pitch angle |
| $\alpha_2$ | chain wheel pitch angle |
| $2\alpha_2 = 2\pi/c$ | pitch angle |

The invention has been described with reference to a preferred embodiment. Obviously, alterations and modifications will suggest themselves to those skilled in the art upon reading and understanding the Detailed Description of the Invention set forth herein. For example, the specific embodiments of FIGS. 2 and 3 show a noncircular driving gear in toothed contact with a noncircular driven gear. Obviously, an intermediate noncircular gear can be inserted between the driving gear 3*a* and driven gear 4*a*. The gear ratios between noncircular driving and driven gears can be varied within the ranges discussed above, but circular gears (3, 4) as shown in FIG. 1 can be employed with the noncircular gears to produce any desired gear ratio. The embodiments have been discussed with reference to steel chains. Other chain compositions such as thermoplastic chains can be employed. Also, those skilled in the art will recognize that "driving" and "driven" is used in the context of two gear wheels in drive relationship with one another. Thus a sprocket or pinion is a driving gear wheel driving a "driven" gear wheel. The "driven" gear wheel is driving a chain wheel and it that sense is a "driving" gear wheel. It is intended to cover all such modifications and alterations insofar as they come within the scope of the present invention.

Having thus defined the invention it is claimed:

1. In a chain drive having a rotatable chain wheel with pockets or teeth connected by straight lines to form a polygon for driving pivot chains or round link chains, the axis of said chain wheel rotatably fixed to a driven gear wheel of a spur gear driving arrangement, said driven gear wheel having a variably sized pitch circle for reducing variations in velocity and acceleration of said chain wheel, the improvement comprising: said spur gear driving arrangement including a driving gear wheel for driving said driven gear wheel at an adjusted gear ratio, said chain wheel and said drive gear rotatable on a common axis; and at least one of said driving and driven gear wheels having a noncircular toothed gear wheel configuration established relative to the pitch circle and including a plurality of rolling curve means for causing said chain wheel to have a minimum angular velocity at a corner of said polygon and a maximum velocity at a mid-point of a straight side of said polygon while said driving wheel rotates at a constant angular velocity.

2. The improvement of claim 1 wherein said polygon for said round link chains comprises a plurality of short straight lines and a plurality of long straight lines with a long straight line adjacent an end of a short straight line, said short straight lines corresponding to corners of said polygon, and the pitch circle radius of said noncircular gear wheel at the middle of any short straight line is greater than the pitch circle radius at the middle of any long straight line.

3. The improvement of claim 1 wherein said chain drive has pivot chains, said driven gear wheel having said noncircular toothed gear wheel configuration, said plurality of rolling curve means including a plurality of continuous rolling curve sections at the pitch curve circumference of said driven gear, said plurality of continuous rolling curve sections equal in number to the number of teeth in said chain wheel.

4. The improvement of claim 3 wherein at least one of said driven and driving gear sets that does not have its driven gear rotatively fixed to said chain wheel is a circular gear set.

5. The improvement of claim 3 wherein a plurality of driving and driven gear sets have noncircular rolling sections.

6. The improvement of claim 3 wherein said driving gear wheel has a noncircular toothed gear wheel configuration, said noncircular configuration including a plurality of continuous rolling curve sections at the pitch curve circumference of said driving gear.

7. The improvement of claim 6 wherein said driving gear wheel has an arbitrary number of said continuous rolling curve sections equal to or greater than one.

8. The improvement of claim 6 wherein a set gear ratio is established according to the relationship $i_m=\phi_1/\sin\alpha_2$ where:

$i_m$ is the gear ratio at the corner middle of said polygon;

$\phi_1$ is the angle of rotation off said driving gear wheel; and, $\alpha_2$ is the pitch angle of said driven gear wheel.

9. The improvement of claim 1 wherein both said driven and driving gear wheels have a noncircular toothed gear wheel configuration comprising a plurality of continuous rolling curve sections and the intersection of adjacent rolling curve sections of said driven gear wheel have concave, unilaterally bent adjustment curve surfaces tangential to said rolling curve sections.

10. The improvement of claim 1 wherein both said driven and driving gear wheels have a noncircular toothed gear wheel configuration comprising a plurality of continuous rolling curve sections and the intersection of adjacent rolling curve sections of said driven gear is defined by an undulating adjustment curve surface in tangential contact at its ends to said rolling curve sections.

11. The improvement of claim 10 wherein said undulating curve is mathematically defined as being selected from the mathematical group consisting of a polynomial of fourth order and a modified trigonometric function of x sin x.

12. The improvement of claim 9 wherein a pie section for each part component extends radially inward to a centering hub section recessed relative to an end face of a part component, said hub section of one part component in face contact with said hub section of the other part component to form said assembled driven gear wheel.

13. The improvement of any one of claims 9 or 10 wherein the shape of said rolling curve sections adjacent the intersection of rolling curve sections is varied over a portion of each rolling curve section adjacent said intersection to maintain said set gear ratio.

14. The improvement of claim 1 wherein both said driven and driving gear wheels have a noncircular toothed gear wheel configuration, said rolling curve means comprising a plurality of continuous rolling curve sections and the number of said continuous rolling curve sections for said driving gear wheel is set relative to a pitch angle of said driving gear wheel to establish a set gear ratio of said driving gear wheel to said driven gear wheel.

15. The improvement of claim 14 wherein the geometric shape of said continuous rolling curve sections is set to produce a constant driving angular velocity determined by multiplying the driven angular velocity of said driven gear wheel determined by the expression $\omega_2=\omega_1/i$ with a gear ratio, $i_m$, established at the corner middle of said polygon and the cosine of the driven angle $\phi_2$, to achieve said set gear reduction, i, according to the relation $i=i_m \cos \phi_2$ where:

$\omega_2$ the angular velocity of said driven gear wheel, $\omega_1$ is the angular velocity of said driving gear wheel, $\phi_2$ is the angle of rotation of said driven gear wheel.

16. The improvement of claim 15 wherein said continuous rolling curve sections have a geometric shape that allows said set gear ratio, i, to be approximated by mathematical techniques selected from the group consisting of basic polynomials, composite polynomials, trigonometric functions, Fourier series, periodic mathematical functions, approximating mathematical functions, and sections of eccentric circular arcs.

17. The improvement of claim 1 wherein both said driven and driving gear wheels have a noncircular toothed gear wheel configuration comprising a plurality of continuous rolling concave curve sections and said driven gear wheel comprises first and second part components nested into one another in an assembled condition, each part component having pie sections separated by an arcuate gap and each pie section having at its outer edge a continuous rolling section whereby said pie section of one part component nests into said arcuate gap of the other part component to form said driven gear wheel.

18. The chain drive according to claim 1 wherein the polygon is formed to drive a round link chain.

19. The chain drive according to claim 1 wherein the claim wheel polygon (29) is shifted outwardly by equipment polygon straight lines (26) for shifting together points of intersection (17) along the periphery.

20. The chain drive according to claim 1 wherein the chain wheel polygon (29) is shifted outwardly by equivalent polygon straight lines (26) for placing ten points of intersection (17) along the periphery.

21. In a chain drive having a rotatable chain wheel with pockets or teeth connected by straight lines to form a polygon for driving pivot chains or round link chains, the axis of said chain wheel rotatably fixed to a driven gear wheel of a spur gear driving arrangement, said driven gear wheel having a variably sized pitch circle for reducing variations in velocity and acceleration of said chain wheel, the improvement comprising: said spur gear driving arrangement including a driving gear wheel for driving said driven gear wheel at an adjusted gear ratio, said chain wheel and said drive gear rotatable on a common axis; and at least one of said driving and driven gear wheels having a noncircular toothed gear wheel configuration established relative to the pitch circle and including a plurality of rolling curve means for causing said chain wheel to have a minimum angular velocity at a corner of said polygon and a maximum velocity at a mid-point of a straight side of said polygon while said driving wheel rotates at a constant angular velocity, wherein said polygon for said round link chains comprises a plurality of short straight lines and a plurality of long straight lines with a long straight line adjacent an end of a short straight line, said short straight lines corresponding to corners of said polygon, and the pitch circle radius of said noncircular gear wheel at the middle of any short straight line is greater than the pitch circle radius at the middle of any long straight line, wherein said chain drive has round link chains, said driven gearwheel having said noncircular toothed gearwheel configuration, said rolling curve means including a plurality of continuous rolling curve sections at the pitch curve circumference of said driven gear, said plurality of continuous rolling curve sections equal in number to twice the number of teeth in said chain wheel.

22. The improvement of claim 21 wherein said driving gear wheel has a noncircular toothed gear wheel configuration, said noncircular configuration including a plurality of continuous rolling curve sections at the pitch curve circumference of said driving gear.

23. The improvement of claim 22 wherein said driving gear wheel has an even number of said continuous rolling curve sections.

24. The improvement of claim 22 wherein a set gear ratio is established according to the relationship $$i_m = \frac{\beta_1 + \gamma_1}{\sin\beta_2 + \sin\gamma_2}$$

where:

$i_m$ is the gear ratio at the center of a short straight line of said polygon;

$\beta_1$ is the pitch angle of said driving gear wheel for said long polygon side;

$\beta_2$ is the pitch angle of said driven gear wheel for said long polygon side;

$\gamma_1$ is the pitch angle of said driving gear wheel for said short polygon side; and, $\gamma_2$ is the pitch angle of said driven gear wheel for said short polygon side.

25. A spur gear chain drive arrangement for driving pivot chains or round link chains comprising:

a) a chain wheel having pockets or teeth for driving said chains forming a straight sided polygon having corners at said teeth and long straight sides between adjacent teeth when said chains are pivot chains and straight short side corners at said teeth and long side straight sides between adjacent teeth when said chains are round link chains;

b) a driving spur gear connected to a source of rotation;

c) a driven spur gear rotatably fixed and circumferentially positioned relative to said chain wheel on a common axis of rotation and rotatably driven by said driving gear;

d) said driving and driven gears having teeth formed on a plurality of concave, noncircular rolling sections extending about each gear's pitch circle circumference, each noncircular rolling section having a distance from the center of each gear which is longest at the center of said corners of said polygon and shortest at the center of said long straight sides of said polygon and said distances and the number of said rolling sections being set to produce a desired gear ratio between said driving and driven gears whereby for constant rotation of said driving gear, angular velocities of said chain wheel varies as said driven gear rotates through a noncircular rolling section while velocities of said chains remain generally constant.

26. The chain drive arrangement of claim 25 wherein said chain drive has pivot chains and said plurality of continuous rolling curve sections in said driven gear being equal in number to the number of teeth in said chain wheel.

27. A spur gear chain drive arrangement for driving pivot chains or round link chains comprising:

e) a chain wheel having pockets or teeth for driving said chains forming a straight sided polygon having corners at said teeth and long straight sides between adjacent teeth when said chains are pivot chains and straight short side corners at said teeth and long side straight sides between adjacent teeth when said chains are round link chains;

f) a driving spur gear connected to a source of rotation;

g) a driven spur gear rotatably fixed and circumferentially positioned relative to said chain wheel on a common axis of rotation and rotatably driven by said driving gear;

h) said driving and driven gears having teeth formed on a plurality of concave, noncircular rolling sections extending about each gear's pitch circle circumference, each noncircular rolling section having a distance from the center of each gear which is longest at the center of said corners of said polygon and shortest at the center of said long straight sides of said polygon and said distances and the number of said rolling sections being set to produce a desired gear ratio between said driving and driven gears whereby for constant rotation of said driving gear, angular velocities of said chain wheel varies as said driven gear rotates through a noncircular rolling section while velocities of said chains remain generally constant, wherein said chain drive has round chains and said plurality of continuous rolling curve sections of said driven gear are equal in number to twice the number of teeth in said chain wheel.

28. The chain drive arrangement of claims 26 or 27 wherein said driving gear has an arbitrary number of said continuous rolling curve sections equal to or greater than one.

29. The chain drive arrangement of claim 28 wherein for round link chains said driving gear wheel has an even number of said continuous rolling curve sections.

30. The chain drive arrangement of claim 28 wherein the number of said continuous rolling curve sections for said driving gear wheel is set relative to a pitch angle of said driving gear wheel to establish a set gear ratio of said driving gear wheel to said driven gear wheel.

31. The chain drive arrangement of claim 28 wherein for pivot chains, a set gear ratio is established according to the relationship $$i_m = \phi_1 / \sin \alpha_2$$

where:

$i_m$ is the gear ratio at the corner center of said polygon;

$\phi_1$ is the angle of rotation of said driving gear wheel, and, $\alpha_2$ is the pitch angle of said driven gear wheel.

32. The chain drive arrangement of claim 28 wherein for round link chains, a set gear ratio is established according to the relationship $$i_m = \frac{\beta_1 + \gamma_1}{\sin\beta_2 + \sin\gamma_2}$$

where:

$i_m$ is the gear ratio at the corner centers of said polygon;

$\beta_1$ is the pitch angle of said driving gear wheel for said long polygon side;

$\beta_2$ is the pitch angle of said driven gear wheel for said long polygon side;

$\gamma_1$ is the pitch angle of said driving gear wheel for said short polygon side; and, $\gamma_2$ is the pitch angle of said driven gear wheel for said short polygon side.

33. The chain drive arrangement of claim 28 wherein the intersection of adjacent rolling curve sections of said driven gear wheel have concave, unilaterally bent adjustment curve surfaces tangential to said rolling curve sections.

34. The chain drive arrangement of claim 28 wherein the intersection of adjacent rolling curve sections of said driven gear is defined by an undulating adjustment curve surface in tangential contact at its ends to said rolling curve sections.

35. The chain drive arrangement of claim 28 wherein said driven gear comprises first and second part components nested into one another in an assembled condition, each part component having pie sections separated by an arcuate gap and each pie section having at its outer edge a continuous rolling section whereby said pie section of one part component nests into said arcuate gap of the other part component to form said driven gear.

36. The chain drive arrangement of claim 35 wherein said pie section for each part component extends radially inward to a centering hub section recessed relative to an end face of a part component, said hub section of one part component in face contact with said hub section of the other part component to form said assembled driven gear wheel.

37. The chain drive arrangement of claim 28 wherein the configuration of said rolling curve section is in the shape of a cardioid and comprises that portion of a cardioid which most closely resembles a circular arc.

38. The chain drive of claim 37 wherein said rolling curve section of said driven gear is determined by the mathematical expression:

$$r_2 = \frac{a \cdot i_m \cos\phi_2}{1 + i_m \cos\phi_2}$$

where:

$r_2$ is locus of points defining the cardioid for the driven gear;

$\alpha$ is the distance between centers of driving and driven gear;

$i_m$ is the gear ratio at the middle of a polygon corner; and, $\phi_2$ is the angle of rolling curve arc of driven gear.

39. The chain drive arrangement of claim 25 wherein the driven chain is a round link chain (8), wherein a pitch curve radius **(13*a*) of the driven spur gear wheel (3) is greater in a middle of a shorter equivalent polygon straight line (30) than in a middle of a longer equivalent polygon straight line (31)**.

40. A chain drive comprising a driving gear wheel;

a driven gear wheel engaged by the driving gear wheel, wherein the driving gear wheel and the driven gear wheel form a spur gear driving arrangement, wherein said spur gear driving arrangement is including the driving gear wheel for driving said driven gear wheel at an adjusted gear ratio;

a rotatable chain wheel having peripheral engagement elements forming corner points connected by straight lines to form a polygon for driving chains, the axis of said chain wheel rotatably fixed to the driven gear wheel, wherein said chain wheel and said driven gear wheel are rotatable on a common axis; wherein said driven gear wheel has a variably sized pitch circle for reducing variations in velocity and acceleration of said chain wheel;

wherein at least one of said driving gear wheel and said driven gear wheel has a noncircular toothed gear wheel configuration established relative to the pitch circle and including a plurality of rolling curve means for causing said chain wheel to have a first extremum of the angular velocity of the chain wheel at a corner of said polygon and a second extremum of the angular velocity of he chain wheel at a mid-point of a straight side of said polygon while said driving wheel rotates at a constant angular velocity.

41. A spur gear chain drive arrangement for driving chains comprising:

a chain wheel having engagement elements for driving said chains, wherein the engagement elements form a straight sided polygon having corners at said engagement elements and long straight sides between adjacent engagement elements;

a driving spur gear connected to a source of rotation;

a driven spur gear rotatably fixed and circumferentially positioned relative to said chain wheel on a common axis of rotation and rotatably driven by said driving spur gear;

wherein said driving spur gears and said driven spur gears include teeth formed on a plurality of concave, noncircular rolling sections extending about each spur gear's pitch circle circumference, wherein each noncircular rolling section has a distance from a center of each spur gear, which distance is longest at the center of said corners of said polygon and which distance is shortest at the center of said long straight sides of said polygon and said distances and the number of said rolling sections being set to produce a desired gear ratio between said driving and driven gears whereby for constant rotation of said driving gear, angular velocities of said chain wheel varies as said driven gear rotates through a noncircular rolling section while velocities of said chains remain generally constant.

* * * * *